DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JULY 25, 1972

900 O.G. 1234

T900,029

COLOR DIFFUSION TRANSFER PROCESS

Charles R. Barr, Kodak Park Works,
Rochester, N.Y. 14626

Filed July 6, 1971, Ser. No. 160,132
**Int. Cl. G03c *7/00***
U.S. Cl. 96—3
No Drawing. 44 Pages Specification

A color diffusion transfer process is described wherein:

(A) a photographic element comprising a support having thereon at least one photosensitive silver halide emulsion layer containing
  (a) a nondiffusible coupler capable of reacting with an oxidized aromatic primary amine to release a diffusible dye or dye precursor, and
  (b) a nondiffusible aromatic primary amine, is exposed;

(B) the photographic element is then treated with a silver halide developing agent to effect development and thereby oxidize the developing agent;

(C) the oxidized developing agent then cross-oxidizing the amine;

(D) the oxidized amine then reacting with the nondiffusible coupler to release a diffusible dye or dye precursor imagewise as a function of the imagewise exposure of each emulsion layer; and (E) at least a portion of each of the imagewise distributions of diffusible dye or dye precursor diffusing to a dye image-receiving layer to provide a transfer image.

Preferred nondiffusible couplers have the formula:

DYE-LINKING GROUP-BALLASTED COUPLER

Preferred nondiffusible amines have the formula:

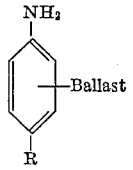

wherein R can be (1) $OR^1$ wherein $R^1$ is H or a hydrolyzable moiety, or (2)

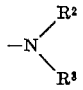

wherein $R^2$ and $R^3$ are each H or alkyl.

The nondiffusible coupler and nondiffusible amine could also be combined into a single compound.